(12) United States Patent
Narasimhan et al.

(10) Patent No.: US 11,493,634 B2
(45) Date of Patent: Nov. 8, 2022

(54) PROGRAMMABLE LIGHT CURTAINS

(71) Applicant: CARNEGIE MELLON UNIVERSITY, Pittsburgh, PA (US)

(72) Inventors: Srinivasa Narasimhan, Pittsburgh, PA (US); Jian Wang, Pittsburgh, PA (US); Aswin C. Sankaranarayanan, Pittsburgh, PA (US); Joseph Bartels, Pittsburgh, PA (US); William Whittaker, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 169 days.

(21) Appl. No.: 16/470,885

(22) PCT Filed: Mar. 11, 2019

(86) PCT No.: PCT/US2019/021569
§ 371 (c)(1),
(2) Date: Jun. 18, 2019

(87) PCT Pub. No.: WO2019/182784
PCT Pub. Date: Sep. 26, 2019

(65) Prior Publication Data
US 2021/0033733 A1   Feb. 4, 2021

Related U.S. Application Data

(63) Continuation-in-part of application No. 15/545,391, filed as application No. PCT/US2016/017942 on Feb. 15, 2016, now Pat. No. 10,359,277.
(Continued)

(51) Int. Cl.
*G01S 17/89* (2020.01)
*G01S 7/4915* (2020.01)
(Continued)

(52) U.S. Cl.
CPC .............. *G01S 17/89* (2013.01); *G01Q 10/00* (2013.01); *G01S 7/4915* (2013.01);
(Continued)

(58) Field of Classification Search
CPC ...... G01S 17/89; G01S 7/4915; G01S 7/4917; G01S 17/48; G01S 17/931; G01S 7/4817;
(Continued)

(56) References Cited

U.S. PATENT DOCUMENTS 4,621,185 A   11/1986   Brown
4,687,325 A   8/1987   Corby, Jr.
(Continued)

FOREIGN PATENT DOCUMENTS

JP   2002039716 A   2/2002
JP   2012168049 A   9/2012
(Continued)

OTHER PUBLICATIONS

Extended European search report for EP Application No. 18742111. 0, dated Jul. 10, 2020, 6 pages.
(Continued)

*Primary Examiner* — Marnie A Matt
(74) *Attorney, Agent, or Firm* — KDB Firm PLLC (57) ABSTRACT

Embodiments described herein are generally directed to a device that monitors for the presence of objects passing through or impinging on a virtual shell near the device, referred to herein as a "light curtain", which is created by rapidly rotating a line sensor and a line laser in synchrony. The boundaries of the light curtain are defined by a sweeping line defined by the intersection of the sensing and illumination planes.

23 Claims, 7 Drawing Sheets

Related U.S. Application Data (60) Provisional application No. 62/761,479, filed on Mar. 23, 2018, provisional application No. 62/176,352, filed on Feb. 13, 2015.

(51) Int. Cl.
*G01S 7/4912* (2020.01)
*G02B 26/08* (2006.01)
*G03B 21/20* (2006.01)
*G01Q 10/00* (2010.01)
*G01S 17/48* (2006.01)
*G01S 17/931* (2020.01)

(52) U.S. Cl.
CPC ........ *G01S 7/4917* (2013.01); *G02B 26/0875* (2013.01); *G03B 21/2033* (2013.01); *G01S 17/48* (2013.01); *G01S 17/931* (2020.01)

(58) Field of Classification Search
CPC .... G01S 17/32; G01Q 10/00; G02B 26/0875; G03B 21/2033
USPC ........................................................ 356/4.01
See application file for complete search history.

(56) References Cited

U.S. PATENT DOCUMENTS

| | | | |
|---|---|---|---|
| 4,687,326 A | 8/1987 | Corby, Jr. | |
| 5,128,753 A | 7/1992 | Lemelson | |
| 5,717,390 A * | 2/1998 | Hasselbring | G01S 17/89 342/51 |
| 5,852,672 A | 12/1998 | Lu | |
| 6,043,905 A | 3/2000 | Kato | |
| 6,529,627 B1 | 3/2003 | Callari et al. | |
| 6,556,307 B1 | 4/2003 | Norita et al. | |
| 7,978,928 B2 | 7/2011 | Tan et al. | |
| 8,400,494 B2 | 3/2013 | Zalevsky et al. | |
| 9,500,477 B2 | 11/2016 | Lee et al. | |
| 9,536,320 B1 * | 1/2017 | Prince | H04N 13/243 |
| 9,838,611 B2 | 12/2017 | Haraguchi | |
| 10,021,284 B2 | 7/2018 | Wang et al. | |
| 10,145,678 B2 | 12/2018 | Wang et al. | |
| 10,359,277 B2 * | 7/2019 | Narasimham | H04N 13/243 |
| 2001/0035636 A1 | 11/2001 | Adachi | |
| 2002/0014533 A1 | 2/2002 | Zhu et al. | |
| 2004/0151345 A1 | 8/2004 | Morcom | |
| 2006/0132752 A1 | 6/2006 | Kane | |
| 2007/0242872 A1 | 10/2007 | Rudin et al. | |
| 2008/0123939 A1 | 5/2008 | Wieneke | |
| 2009/0066929 A1 | 3/2009 | Tropf | |
| 2009/0201486 A1 | 8/2009 | Cramblitt et al. | |
| 2010/0074532 A1 | 3/2010 | Gordon et al. | |
| 2010/0085425 A1 | 4/2010 | Tan | |
| 2010/0128221 A1 | 5/2010 | Muller et al. | |
| 2010/0303299 A1 | 12/2010 | Cho et al. | |
| 2011/0102763 A1 | 5/2011 | Brown et al. | |
| 2011/0235018 A1 | 9/2011 | Mori et al. | |
| 2011/0292347 A1 | 12/2011 | Zhang et al. | |
| 2011/0299135 A1 | 12/2011 | Takabatake | |
| 2011/0317005 A1 | 12/2011 | Atkinson | |
| 2012/0008128 A1 | 1/2012 | Bamji | |
| 2012/0062705 A1 | 3/2012 | Ovsiannikov et al. | |
| 2012/0062963 A1 | 3/2012 | Gillham et al. | |
| 2012/0200829 A1 | 8/2012 | Bronstein et al. | |
| 2013/0010087 A1 | 1/2013 | Nieten et al. | |
| 2013/0021474 A1 | 1/2013 | Taylor et al. | |
| 2013/0127854 A1 | 5/2013 | Shpunt et al. | |
| 2014/0055771 A1 | 2/2014 | Oggier | |
| 2014/0055779 A1 | 2/2014 | Enami | |
| 2014/0111616 A1 | 4/2014 | Blayvas | |
| 2014/0125775 A1 | 5/2014 | Holz | |
| 2014/0232566 A1 * | 8/2014 | Mimeault | G01S 17/88 340/936 |
| 2014/0247323 A1 | 9/2014 | Griffis et al. | |
| 2014/0253724 A1 * | 9/2014 | Yamagata | G01B 11/24 348/135 |
| 2014/0328535 A1 | 11/2014 | Sorkine-Hornung | |
| 2015/0067929 A1 | 3/2015 | Blanton et al. | |
| 2015/0176977 A1 | 6/2015 | Abele et al. | |
| 2015/0177506 A1 | 6/2015 | Nishiwaki | |
| 2015/0215547 A1 | 7/2015 | Muller | |
| 2015/0281671 A1 | 10/2015 | Bloom et al. | |
| 2015/0285618 A1 | 10/2015 | Haraguchi | |
| 2015/0285625 A1 | 10/2015 | Deane | |
| 2015/0294496 A1 | 10/2015 | Medasani et al. | |
| 2015/0362698 A1 | 12/2015 | Lansel | |
| 2016/0041266 A1 | 2/2016 | Smits | |
| 2016/0065945 A1 | 3/2016 | Yin et al. | |
| 2016/0124203 A1 | 5/2016 | Ryu | |
| 2016/0198147 A1 | 7/2016 | Waligorski et al. | |
| 2016/0209183 A1 | 7/2016 | Bakken et al. | |
| 2016/0335778 A1 | 11/2016 | Smits et al. | |
| 2016/0349369 A1 | 12/2016 | Lee et al. | |
| 2017/0064235 A1 | 3/2017 | Wang et al. | |
| 2017/0127036 A1 | 5/2017 | You et al. | |
| 2017/0142406 A1 | 5/2017 | Ovsiannikov et al. | |
| 2017/0272726 A1 | 9/2017 | Ovsiannikov | |
| 2017/0310948 A1 | 10/2017 | Pei et al. | |
| 2017/0353707 A1 | 12/2017 | Wang et al. | |
| 2017/0366801 A1 | 12/2017 | Horesh | |
| 2018/0094919 A1 * | 4/2018 | Narasimham | G01S 17/88 340/936 |
| 2018/0246189 A1 | 8/2018 | Smits | |
| 2018/0252800 A1 | 9/2018 | Morcom | |
| 2018/0307310 A1 | 10/2018 | Mccombe et al. | |
| 2019/0025986 A1 | 1/2019 | Yamauchi | |
| 2019/0236796 A1 | 8/2019 | Blasco Claret et al. | |

FOREIGN PATENT DOCUMENTS

| | | |
|---|---|---|
| JP | 2015513825 A | 5/2015 |
| WO | 03016982 A2 | 2/2003 |
| WO | 2015003108 A1 | 1/2015 |
| WO | 2015119872 A1 | 8/2015 |
| WO | 2016131036 A1 | 8/2016 |

OTHER PUBLICATIONS

International Search Report and Written Opinion for International application No. PCT/US2018/014369, dated Apr. 26, 2018, 8 pages.
Communication pursuant to Article 94(3) EPC for European Patent Application No. 18742111.0, dated Dec. 16, 2021, 5 pages.
International Search Report and Written Opinion for International Application No. PCT/US2019/21569, dated May 24, 2019.
Achar, S., et al., "Epipolar Time-of-Flight Imaging", ACM Transactions on Graphics, 36(4):37:1-37:2, Jul. 4, 2017.
Wang, J., et al., "Programmable Triangulation Light Curtains", ECCV Computer Vision Foundation, [online] <URL: http://openaccess.thecvl.com/content_ECCV_2018/papers/Jian_Wang_Programmable_Lght_Curtains_ECCV_2018_paper.pdf>, pp. 1-14 (2018).
O 'Toole, M., et al., "Homogeneous Codes for Energy-Efficient Illumination and Imaging" (2015).
Tadano, R., et al., "Depth Selective Camera: A Direct, On-chip, Programmable Technique for Depth Selectivity in Photography", IEEE International Conference on Computer Vision (2015).
Blais, F., "Review of 20 Years of Range Sensor Development", Journal of Electronic Imaging, 13(1): 231-240, Jan. 2004.
Heckman, P. J., "Underwater Range Gated Photography", Proc. SPIE 0007, Underwater Photo Optics I, Jun. 1, 1966, [online] https://www.spiedigitallibrary.org/conference-proceedings-of-spie on Jan. 28, 2019.
Jarvis, R. A., "A Perspective on Range Finding Techniques for Computer Vision", IEEE Transactions on Pattern Analysis and Machine Intelligence, vol. PAMI-5, No. 2, pp. 122-139, Mar. 1983.
Barry, A.J., et al., "Pushbroom Stereo for High-Speed Navigation in Cluttered Environments", IEEE International Conference on Robotics and Automation (ICRA), pp. 3046-3052, (2015).
International Search Report and Written Opinion for International Patent Application No. PCT/US16/17942, dated May 19, 2016.

(56) References Cited

OTHER PUBLICATIONS

International Preliminary Report on Patentability for International Patent Application No. PCT/US16/17942, dated Aug. 15, 2017.
O'Toole et al. "3D Shape and Indirect Appearance by Structured Light Transport." University of Toronto. 2014 (2014), pp. 1-3, 6-7 [on line] <URL: http://www.cs.toronto.edu/-kyros/pubs/14.cvpr.slt.pdf>.
O'Toole et al. "Prima-Dual Coding to Probe Light Transport." ACM. 2012 (2012), p. 39:1-39:6 [online] <URL:http://www.cs.toronto.edu/-kyros/pubs/12.sig.pdc.pdf>.
International Search Report and Written Opinion for International application No. PCT/US19/052854 dated Jul. 15, 2020, 8 pages.
Extended European search report for Application No. EP19772623.5, dated Oct. 22, 2021, 7 pages.

\* cited by examiner

PROGRAMMABLE LIGHT CURTAINS

RELATED APPLICATIONS

This application is a national phase filing under 35 U.S.C. § 371 claiming the benefit of and priority to International Patent Application No. PCT/US2019/021569, filed on Mar. 11, 2019, which claims the benefit of U.S. Provisional Patent Application Ser. No. 62/761,479, filed Mar. 23, 2018. This application is a Continuation-In-Part of U.S. patent application Ser. No. 15/545,391, which is a national phase filing under 35 U.S.C. § 371 claiming the benefit of and priority to International Patent Application No. PCT/US2016/017942, filed on Feb. 15, 2016, which claims the benefit of U.S. Provisional Patent Application Ser. No. 62/176,352, filed Feb. 13, 2015. The entire contents of these applications are incorporated herein by reference.

GOVERNMENT INTEREST

This invention was made with government support under CNS1446601 awarded by the NSF, N000141512358 awarded by the ONR, N000141612906 awarded by the ONR, DTRT13GUTC26 awarded by the DOT, and HR00111620021 awarded by DARPA. The government has certain rights in the invention.

BACKGROUND OF THE INVENTION 3D sensors play an important role in the deployment of many autonomous systems, including field robots and self-driving cars. However, there are many tasks for which it may not be necessary to use a full-blown 3D scanner. As an example, a self-guided vehicle on a road or a robot in the field does not need a full-blown 3D depth sensor to detect potential collisions or to monitor its blind spot. Instead, what is necessary is for the vehicle to be able to detect any object that comes within a pre-defined perimeter of the vehicle to allow for collision avoidance. This is a much easier task than full depth scanning and object identification.

Consider a robot that is maneuvering a dynamic terrain. While full 3D perception is important for long-term path planning, it is less useful for time-critical tasks like obstacle detection and avoidance. Similarly, in autonomous driving, collision avoidance is a task that must be continuously performed but does not require full 3D perception of the scene. For such tasks, a proximity sensor with much reduced energy and computational footprint may be sufficient.

SUMMARY OF THE INVENTION

This summary is presented to provide a basic understanding of some novel embodiments described herein. This summary is not an extensive overview, and it is not intended to identify key/critical elements or to delineate the scope of the invention. Some concepts are presented in a simplified form as a prelude to the more detailed description that is presented later.

Various embodiments are generally directed to a device that monitors the presence of objects passing through or impinging on a virtual shell near the device, which is referred to herein as a "light curtain". Light curtains offer a lightweight, resource-efficient and programmable approach for proximity awareness for obstacle avoidance and navigation. They also have additional benefits in terms of improving visibility in fog as well as flexibility in handling light fall-off.

In one embodiment, the light curtains are created by rapidly rotating a line sensor and a line laser in synchrony. The embodiment is capable of generating light curtains of various shapes with a range of 20-30 m in sunlight (40 m under cloudy skies and 50 m indoors) and adapts dynamically to the demands of the task.

In one embodiment, light curtains may be implemented by triangulating an illumination plane, created by fanning out a laser, with a sensing plane of a line sensor. In the absence of ambient illumination, the sensor senses light only from the intersection between these two planes, which, in the physical world, is a line. The light curtain is then created by sweeping the illumination and sensing planes in synchrony.

In another embodiment, the light curtains may have a programmable shape to allow for the detection of objects along a particular perimeter, such as for detecting a vehicle impinging on a lane for a self-driving vehicle.

In yet another embodiment, the capability of the light curtain can be enhanced by using correlation-based time-of-flight (ToF) sensors.

The light curtain is capable of detecting the presence of objects that intersect a virtual shell around the system. By detecting only the objects that intersect with the virtual shell, many tasks pertaining to collision avoidance and situational awareness can be solved with little or no computational overhead.

Light curtains provide a novel approach for proximity sensing and collision avoid-ance that has immense benefits for autonomous devices. The shape of the light curtain can be changed on the fly and can be used to provide better detections, especially under strong ambient light (like sunlight) as well as global illumination (like fog).

BRIEF DESCRIPTION OF THE DRAWINGS

The Detailed Description of the invention will be better understood when read in conjunction with the figures appended hereto. For the purpose of illustrating the invention, a preferred embodiment is shown in the drawings. It is understood, however, that this invention is not limited to these embodiments or the precise arrangements shown.

FIG. 6(a) shows a light curtain being used for a tilted plane a proximity arc and a path check. FIG. 6(b) shows the application of a light curtain in a self-driving vehicle sensing for upcoming adjacent traffic and an adjacent lane check.

FIG. 7(a-d) are illustrations of light curtains resulting when the sensor and laser rotates about an axis and about a point.

DETAILED DESCRIPTION

The invention is described in detail below. Implementations used in the description of the invention, including implementations using various components or arrangements of components, should be considered exemplary only and are not meant to limit the invention in any way. As one of skill in the art would realize, many variations on implementations discussed herein which fall within the scope of the invention are possible. Accordingly, the exemplary methods and apparatuses disclosed herein are not to be taken as limitations on the invention, but as an illustration thereof.

Figure 1:
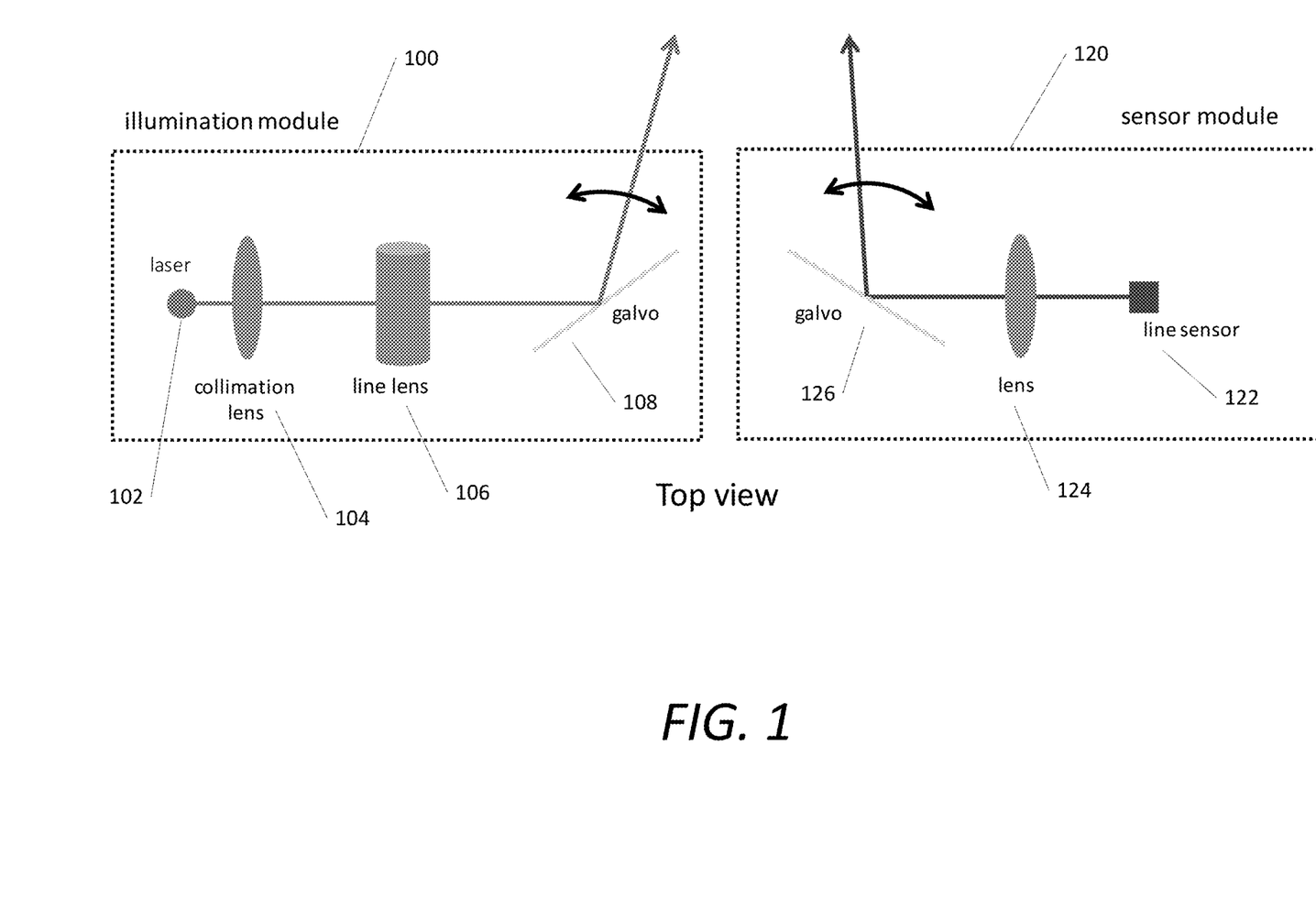
FIG. 1 is a schematic view of the components of the light curtain device.

In one embodiment, the device consists of a line scan laser (illumination module 100) and a line scan sensor (sensor module 120) as shown in a top view in FIG. 1. In one embodiment, illumination module 100 uses a laser diode 102 as a light source. In one embodiment, the laser diode 102 may be, for example, a 638 nm laser diode with the peak power of 700 mW. The light emitted from laser diode 102 is collimated using collimation lens 104. The light is stretched into a line with line lens 106, which may, in some embodiments, be a 45° Powell lens.

To steer the light beam, a steerable galvo mirror 108 is used. In preferred embodiments, the galvo mirror has a dimension of 11 mm×7 mm and has a 22.5° mechanical angle, providing the sensor and laser with a 45° field of view. The galvo mirror 108 takes approximately 500 μs to rotate through a 0.2° optical angle. A micro-controller is used to synchronize the sensor, the laser and the galvo mirrors 108, 126. In preferred embodiments, the galvo mirror 108 used for the illumination module 100 and the galvo mirror 126 use for sensor module 120 will be identical. In alternate embodiments, a mechanical motor may be used to steer the light beam and sensor. In yet other embodiments, a 2D sensor and with a rolling shutter or a region of interest mask may be used to effectively emulate a faster line sensor.

Sensor module 120 comprises a line sensor 122, lens 124 and steerable galvo mirror 126. In one embodiment, line sensor 122 is a line scan intensity sensor. In one embodiment, the line scan intensity sensor is a 6 mm f/2 S-mount lens having a diagonal field-of-view of 45° and an image circle 7 mm in diameter. The line sensor may have 2048×2 total pixels with the pixel size being approximately 7 μm×7 μm. In preferred embodiments, only the central 1000 pixels of the sensor are used due to the limited circle of illumination of the lens. Preferably, the line scan sensor may be capable of scanning 95,000 lines per second and may be fitted with an optical bandpass filter having a 630 nm center wavelength and a 50 nm bandwidth suppress ambient light.

In preferred embodiments, the rotation axes are aligned to be parallel and fixed with a baseline of 300 mm. The resulting field-of-view of the system is approximately 45° by 45°.

Figure 2:
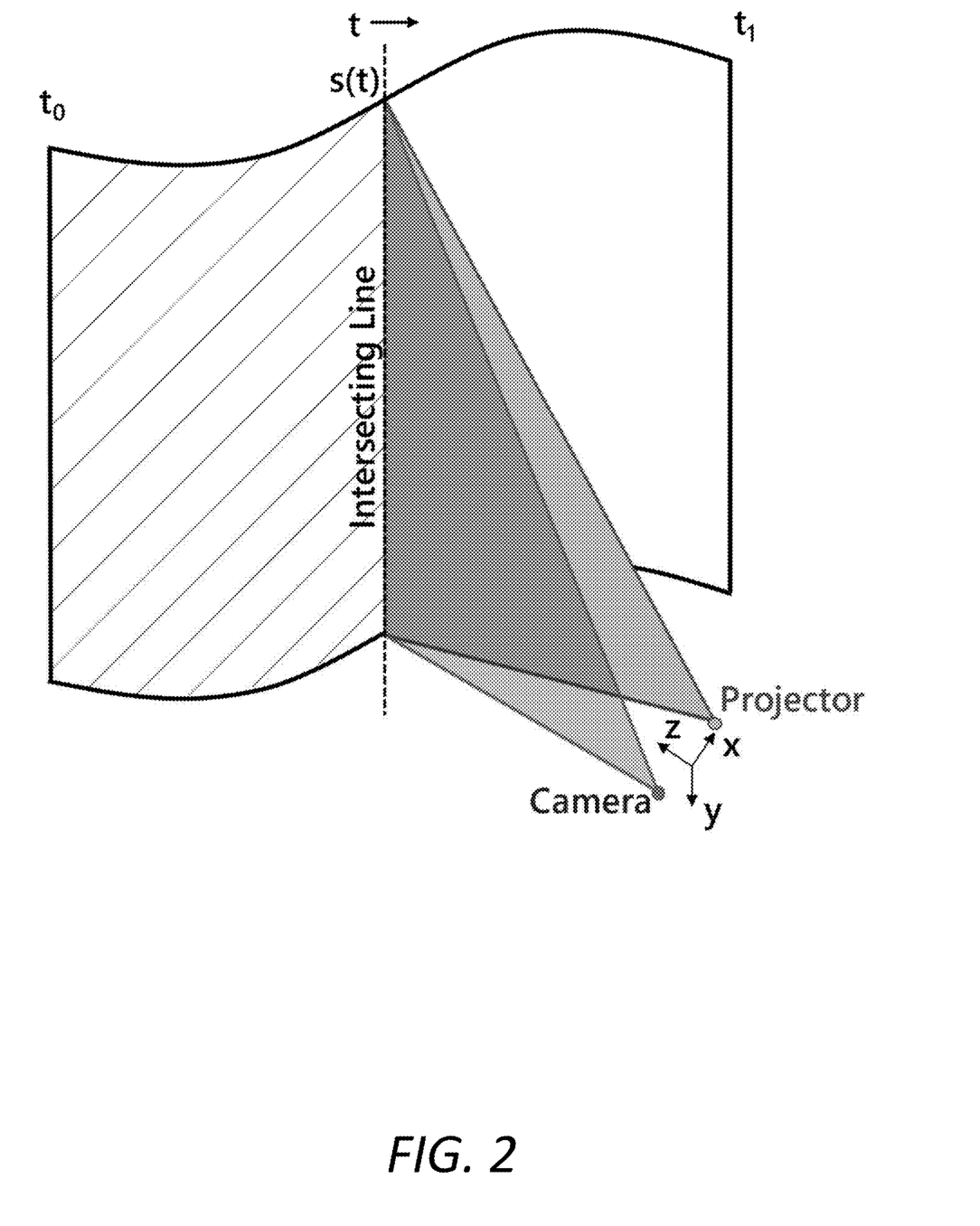
FIG. 2 is a diagram showing the intersecting planes of the light projector the sensor and the formation of the light curtain by synchronously scanning the projector and sensor such as to move the intersecting line of the planes in the desired shape.
Figure 3:
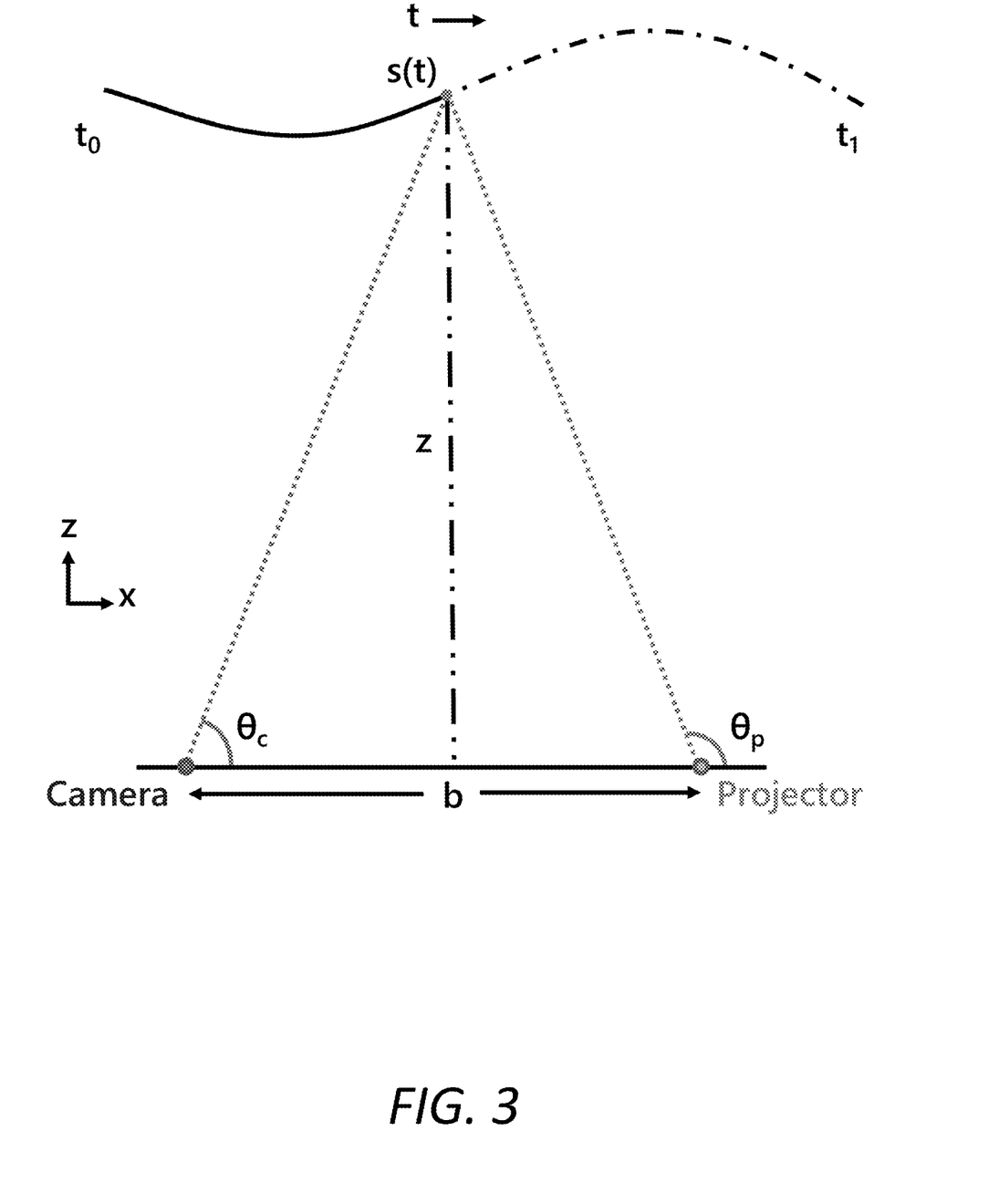
FIG. 3 is a top view of the diagram of FIG. 2.

The Powell lens 106 fans the laser beam into a planar sheet of light and the line sensor 122 senses light from a single plane. In the general configuration, the two planes intersect at a line in 3D, as shown in a perspective view FIG. 2 and in a top view in FIG. 3. In the absence of ambient and indirect illuminations, the line sensor 122 measures light scattered by any object on the line. By rotating both the line sensor 122 and the laser 102 at a high speed, the intersecting line can be swept to form any ruled surface. This ruled surface, on which presence of objects can be detected, is the light curtain. The resulting device is programmable, in terms of its light curtain shape, and flexible, in terms of being able to vary laser power and sensor exposure time to suit the demands of an application.

Figure 4:
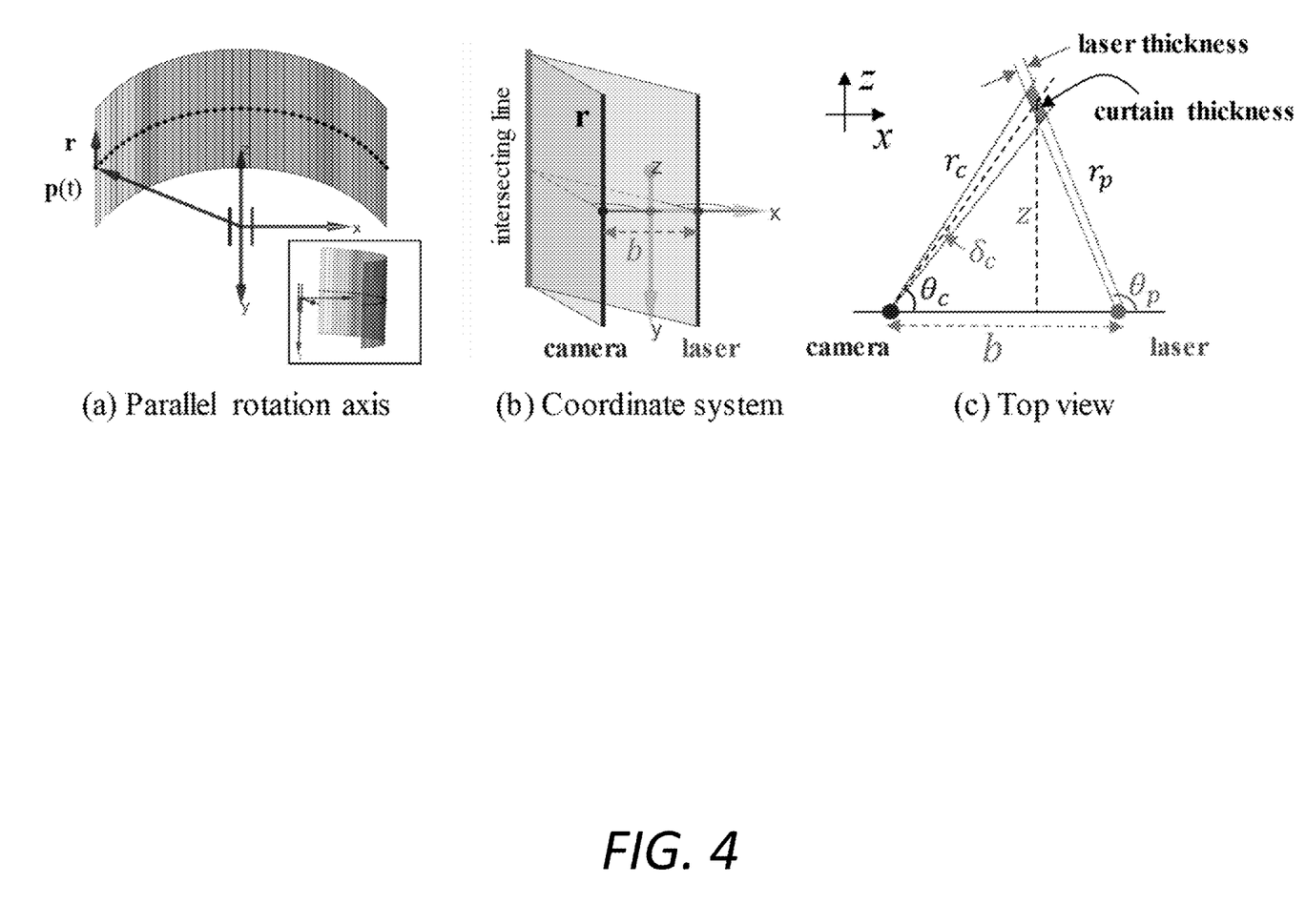
FIG. 4 is a diagram showing (a) an illumination geometry of a light curtain generated by rotating the laser light plane and sensor plane about a parallel axis; (b) the coordinate frame showing various parameters; and (c) a top view of the coordinate system shown in (b).
Figure 5:
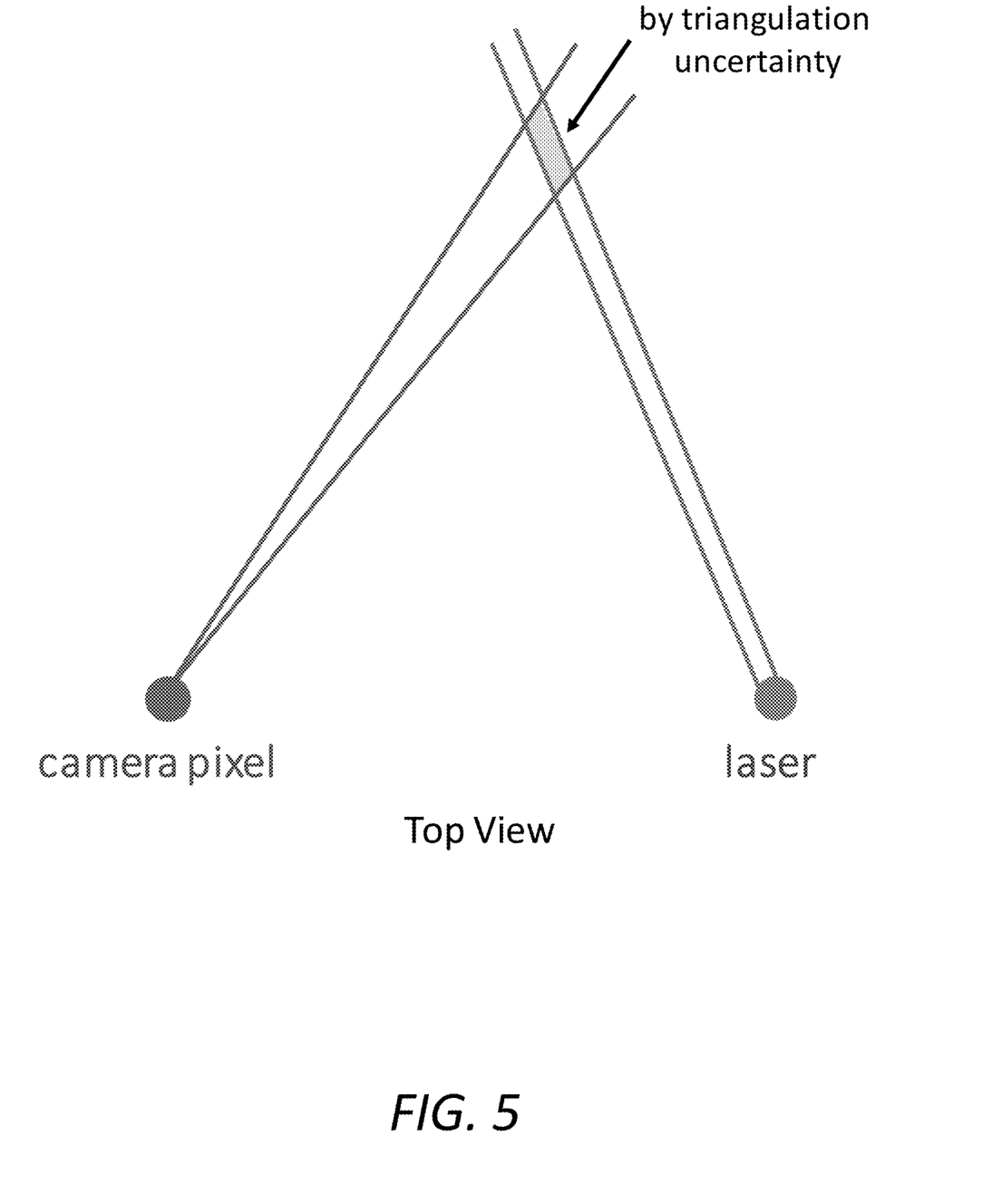
FIG. 5 is a diagram showing the thickness of the light curtain.

FIG. 4(*a*) shows the viewing and illumination geometry of a light curtain generated by rotating the laser light plane and sensor plane about parallel axes r. The intersection line is also parallel to the two rotation axes, as shown in FIG. 4(*b*). The coordinate frame of FIG. 4(*b*) and top view of FIG. 4(*c*) show various parameters of interest. Note that changing $\theta_c$ and $\theta_p$ synchronously generates light curtains with different shapes. FIG. 4(*c*) and FIG. 5 show that the finite sizes of sensor pixels and finite thickness of laser sheet lead to a thick light curtain upon triangulation.

When operated in strong ambient light, for example, sunlight, the sensor 122 also measures the contribution from the ambient light illuminating the entire scene. To suppress this, two image captures are performed at sensor 122 for each setting of the galvos, one with and one without illumination from laser 102, each with exposure of 100 μs. The images may then be subtracted to filter out the ambient light.

In one embodiment, galvo mirrors 108, 122 may take time to stabilize after rotation. The stabilization time may be as much as 500 μs before the mirrors are stable enough to capture a line. This limits the overall frame-rate of the device. Adding two 100 μs exposures for laser on and off to filter out ambient light allows a display of 1400 lines per second. If the light curtains are designed to contain 200 lines, the entire light curtain can be refreshed at a rate of 5.6 fps. Galvo mirrors which stabilize in times shorter than 500 μs would allow the curtain refresh rates to reach 20 to 30 fps.

Light Curtains with Parallel Axes of Rotation—

The case where the sensor and laser can each be rotated about a single fixed parallel axis, as shown in FIG. 4, can be implemented by placing two 1D galvo mirrors, one each in the front of the line sensor and in front of the laser, respectively. Let the sensor and laser rotation axes be r. The intersecting line in the curtain will also be parallel and of the form:

$$p_0 + ur$$

where $p_o$ is any 3D point on the line and $u \in (-\alpha, \alpha)$ is the offset along the axis of rotation (see FIG. 4 (*a,b*)). Then, the light curtain $s(t, u) \subset \mathbb{R}^3$ is obtained by sweeping the intersection line such that:

$$s(t,u) = p(t) + ur$$

where $p(t) \in \mathbb{R}^3$ is a 3D path that describes the points scanned by the center pixel on the line sensor and $t \in [0,1]$ is the parameterization of the path.

Given a light curtain s(t, u), the rotation angles of the sensor and laser can be computed. Without loss of generality, it is assumed that the origin of the coordinate system is at the midpoint between the centers of the line sensor and the laser. It is further assumed that the rotation axes are aligned along the y-axis and that the 3D path can be written as $p(t)=[x(t), 0, z(t)]^T$. To achieve this light curtain, suppose that the laser rotates about its axis with an angular profile of $\theta_p(t)$, where the angle is measured counter-clockwise with respect to the x-axis. Similarly, the line sensor rotates with an angular profile of $\theta_c(t)$. Let b be the baseline between the laser and the line sensor. $\theta_c(t)$ and $\theta_p(t)$ can be derived as:

$$\begin{bmatrix} \tan \theta_c(t) \\ \tan \theta_p(t) \end{bmatrix} = \begin{bmatrix} \dfrac{\left(x(t) + \dfrac{b}{2}\right)}{z(t)} \\ \dfrac{\left(x(t) - \dfrac{b}{2}\right)}{z(t)} \end{bmatrix} \quad (1)$$

General Light Curtains—

The light curtain device can also be configured with line sensor 122 and laser 102 rotating over non-parallel axes or with each of them enjoying full rotational degrees of freedom. These configurations have their own unique advantages. When the devices have full rotational freedom, i.e., capable of rotating around a point with no restrictions, then any ruled surface (including for example, a mobius strip) can be generated as a light curtain. Full rotational freedom, however, is hard to implement because multi-axis galvos or gimbals are needed and are often cost-prohibitive.

Rotation Over Two Axes—

When the line sensor and line laser rotate over two axes, $l_c$ and $l_p$, respectively, given a 3D path p(t), the generated ruled surface can be determined. Each line in the surface should not only go through p(t), but also be co-planar to $l_c$ and $l_p$ simultaneously. The parametric form of the generated light curtain $s(t, u) \subset \mathbb{R}^3$ can be written as:

$$s(t,u)=p(t)+ur(t)$$

where u is a scalar and $r(t) \in \mathbb{R}^3$ is the direction of the line which is analyzed in the following from easy to general conditions.

Figure 6:
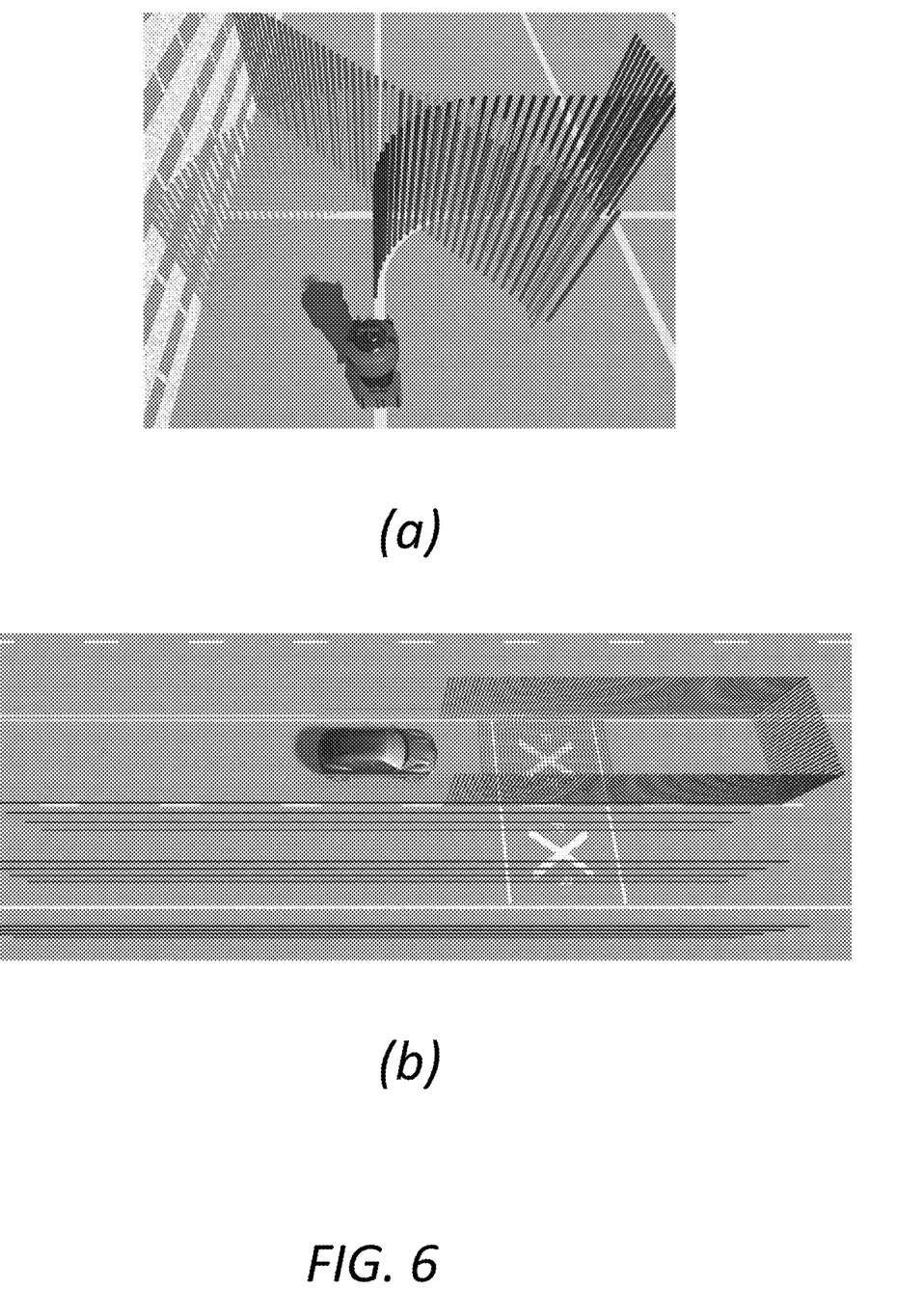
FIG. 6 shows two applications of the light curtain.

FIG. 6 shows two applications of the light curtain. FIG. 6(a) shows a light curtain being used for a tilted plane a proximity arc and a path check. FIG. 6(b) shows the application of a light curtain in a self-driving vehicle sensing for upcoming adjacent traffic and an adjacent lane check.

Figure 7:
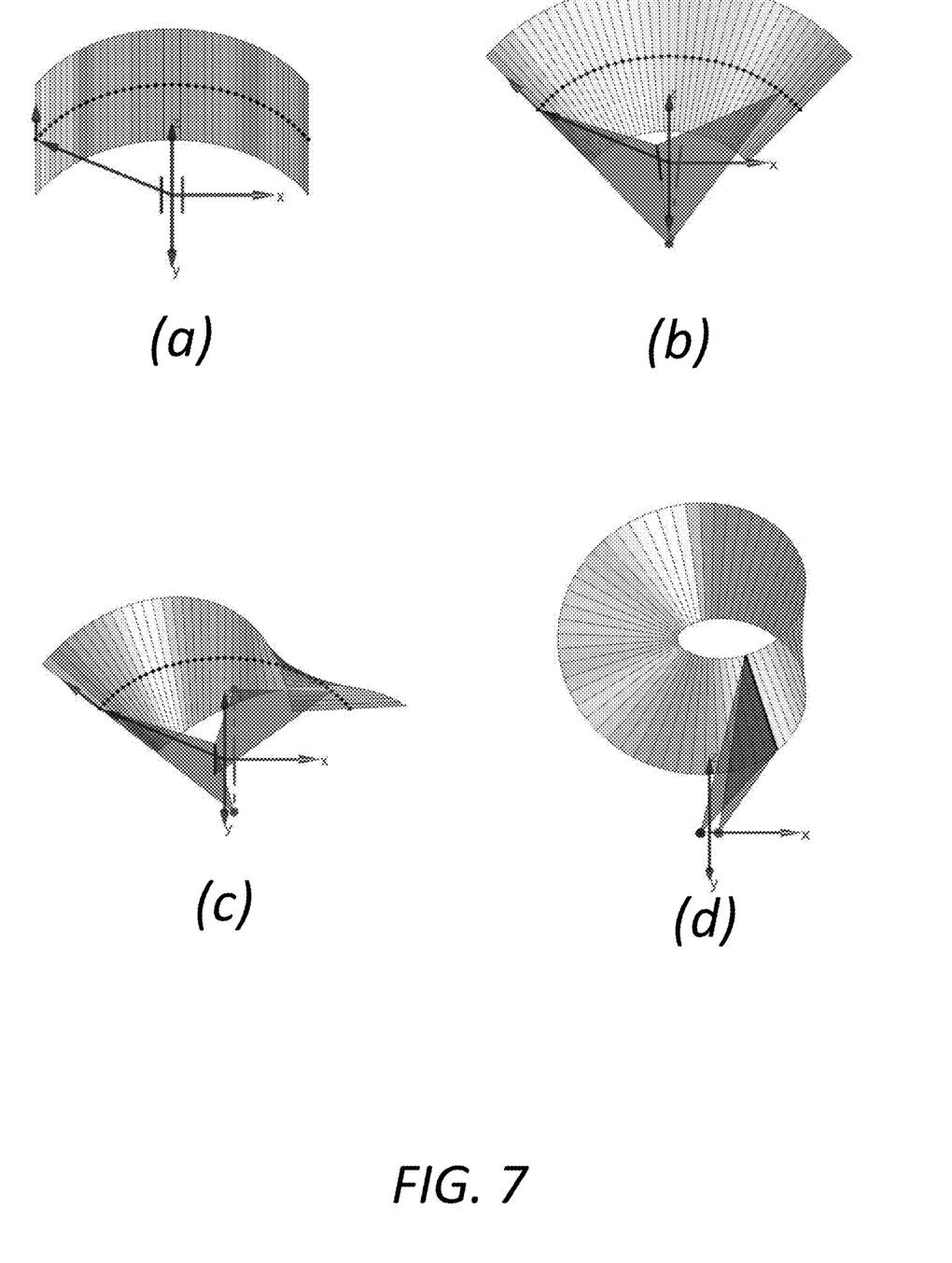

FIG. 7(a,b,c) are illustrations of light curtains resulting when each of the sensor 122 and laser 102 rotates about an axis. FIG. 7(d) is an illustration of a light curtain resulting when the sensor 122 and laser 102 rotate about a point. When $l_c \| l_p$, as shown in FIG. 7(a), the lines in light curtain should also be parallel to $l_c$ or $l_p$, thus r(t) is a constant value and is in the direction of $l_c$. When $l_c$ and $l_p$ intersect at a point, as shown in FIG. 7(b), the lines in light curtain should also go through A, thus:

$$r(t) = \frac{p(t) - A}{\|p(t) - A\|_2}$$

When $l_c$ and $l_p$ are non-coplanar, as shown in FIG. 7(c), r(t) can be derived as follows. If $l_p$ intersects with plane p(t)–$l_c$ at A(t), the line should also pass A(t), thus:

$$r(t) = \frac{p(t) - A(t)}{\|p(t) - A(t)\|_2}$$

If there is no intersection, meaning $l_p$ is parallel to this plane, r(t) should be in the direction of $l_p$.

Given a 3D path p(t), the rotation angles of the line sensor and line laser can be computed as follows. Without loss of generality, assume that the origin of the coordinate system is at the midpoint between the centers of the line sensor 122 and line laser 102. The distance between two centers is b, and the directions of $l_c$ and $l_p$ are M and $N \in \mathbb{R}^3$ respectively. The given 3D path is at the y=0 plane and can be written as $p(t)=[x(t), 0, z(t)]^T$. The rotation angle of sensor 122, which is measured counter-clockwise with respect to the xy-plane, is:

$$\theta_c(t) = \text{angle}\left(\begin{bmatrix}0\\0\\1\end{bmatrix}, \begin{bmatrix}M_x\\M_y\\M_z\end{bmatrix} \times \begin{bmatrix}x(t) = b/2\\0\\z(t)\end{bmatrix}\right)$$

and the rotation angle of laser 102 is similar. They are:

$$\begin{bmatrix}\theta_c(t)\\\theta_p(t)\end{bmatrix} = \begin{bmatrix}\cos^{-1}\dfrac{-M_y\left(x(t) - \dfrac{b}{2}\right)}{\sqrt{M_y^2 z(t)^2 + \left(M_z x(t) + \dfrac{M_z b}{2} - M_x z(t)\right)^2 + \left(M_y x(t) + \dfrac{M_y b}{2}\right)^2}}\\\cos^{-1}\dfrac{-N\left(x(t) - \dfrac{b}{2}\right)}{\sqrt{N_y^2 z(t)^2 + \left(N_z x(t) + \dfrac{N_z b}{2} - N_x z(t)\right)^2 + \left(Nx(t) + \dfrac{N_y b}{2}\right)^2}}\end{bmatrix}$$

When $l_c$ and $l_p$ are co-planar, the equation can be simplified. Without loss of generality, assume both are co-planar at the xy-plane, and are $\pm\gamma$ to the y-axis, $$\begin{bmatrix}\theta_c(t)\\\theta_p(t)\end{bmatrix} = \begin{bmatrix}\cos^{-1}\dfrac{\left(x(t) + \dfrac{b}{2}\right)\cos\gamma}{\sqrt{\left(x(t) + \dfrac{b}{2}\right)^2 \cos^2\gamma + z(t)^2}}\\\cos^{-1}\dfrac{\left(x(t) - \dfrac{b}{2}\right)\cos\gamma}{\sqrt{\left(x(t) - \dfrac{b}{2}\right)^2 \cos^2\gamma + z(t)^2}}\end{bmatrix}$$

and when $l_c \| l_p$, $\gamma=0$, this can be simplified further as:
ii $$\begin{bmatrix}\theta_c(t)\\\theta_p(t)\end{bmatrix} = \begin{bmatrix}\cos^{-1}\dfrac{\left(x(t) + \dfrac{b}{2}\right)}{\sqrt{\left(x(t) + \dfrac{b}{2}\right)^2 + z(t)^2}}\\\cos^{-1}\dfrac{\left(x(t) - \dfrac{b}{2}\right)}{\sqrt{\left(x(t) - \dfrac{b}{2}\right)^2 + z(t)^2}}\end{bmatrix}$$

Rotation Over Two Points—

When line sensor 122 and line laser 102 can rotate over two points respectively (full rotational degree of freedom), any ruled surface can be generated. FIG. 7(d) shows a mobius strip as an example. The proof is trivial, that any line in the ruled surface and the rotation center form a plane, which will determine the rotation of line sensor 122 or line laser 102.

Optimizing Light Curtains—

Parameters of interest in practical light curtains can be quantified, for example, their thickness and SNR of measured detections, and approaches to optimize them are presented herein. Of particular interest is the minimizing of the thickness of the curtain as well as optimizing exposure time and laser power for improved detection accuracy when the curtain spans a large range of depths.

Thickness of Light Curtain—

The light curtain produced by device described herein has a finite thickness due to the finite size of the sensor pixels and finite thickness of the laser illumination. Suppose that the laser spot has a thickness of $\Delta_L$ meters and each pixel has an angular extent of $\delta_c$ radians. Given a device with a baseline of length b meters, imaging a point at depth z(t)=z, then the thickness of the light curtain is given as an area of a parallelogram shaded in FIG. 4(c) and FIG. 5, which evaluates to:

$$A = \frac{r_c^2 r_p \delta_c \Delta_L}{zb} \quad (2)$$

where $r_c$ and $r_p$ is the distance between the intersected point and the sensor and laser, respectively.

Given that different light curtain geometries can produce curtains of the same area, a more intuitive and meaningful metric for characterizing the thickness is the length:

$$U = \frac{A}{\Delta_L} = \frac{r_c^2 r_p \delta_c}{zb}$$

In any given system, changing the laser thickness $\Delta_L$, requires changing the optics of the illumination module. Similarly, changing $\delta_c$ requires either changing the pixel pitch or the field-of-view of the sensor. In contrast, varying the base-line provides an easier alternative to changing the thickness of the curtain that involves a single translation. This is important because different applications often have differing needs regarding the thickness of the curtain. A larger baseline helps in achieving very thin curtains, which is important when there is a critical need to avoid false alarms. On the other hand, thick curtains that can be achieved by having a smaller baseline are important in scenarios where it is critical to avoid mis-detections. Further, a sufficiently thick curtain also helps in avoiding mis-detections caused by the inherent discreteness.

Minimizing the Thickness and Energy for Nearby Light Curtains—

When a light curtain is far away, the largest possible baseline can be used to minimize uncertainty, and regardless of how the device is configured, the consumed energy is close. But, when the light curtain is nearby, the best configuration is nontrivial.

Given the curtain shape in the xz plane p(τ), the optimization problem minimizing thickness by triangulation can be formalized as following:

$$\min_{C,P} \sum_{\tau=0}^{T} U(\tau) = \sum_{\tau=0}^{T} \frac{r_c \tau^2 r_p(\tau)}{|C-P|z(\tau)} \text{ s.t. } -\frac{b}{2} \le C, P \le \frac{b}{2}$$

where $r_c(\tau)$ and $r_p(\tau)$ are the distance from p(τ) to sensor rotation center [C, 0,0] and laser rotation center [P, 0,0] respectively, z(τ) is the depth of p(τ), and $$\left(-\frac{b}{2}, \frac{b}{2}\right)$$

is the range through which the rotate center of the sensor and laser can position. For simplicity, only consider a cross-section of a light curtain in the xz plane.

When the objective is to minimize energy, the problem becomes $$\min_{C,P} \sum_{\tau=0}^{T} E(\tau) = \sum_{\tau=0}^{T} r_p(\tau) r_c(\tau) \text{ s.t. } -\frac{b}{2} \le C, P \le \frac{b}{2}$$

When the objective is to minimize one subject to the other one smaller than some value, like $$\min_{C,P} \sum_{\tau=0}^{T} U(\tau) \text{ s.t. } \min_{C,P} \sum_{\tau=0}^{T} E(\tau) < e, -\frac{b}{2} \le C, P \le \frac{b}{2}$$

and $$\min_{C,P} \sum_{\tau=0}^{T} E(\tau) \text{ s.t. } \min_{C,P} \sum_{\tau=0}^{T} U(\tau) < g, -\frac{b}{2} \le C, P \le \frac{b}{2}$$

the optimization result is hard to predict.

Adapting Laser Power and Exposure—

A key advantage of the light curtain device is that the power of the laser or the exposure time can be adapted for each intersecting line to compensate for light fall-off, which is inversely proportional to the square of the depth. In a traditional projector-sensor system, it is commonplace to increase the brightness of the projection to compensate for light fall-off, so that far-away points in the scene can be well illuminated. However, this would imply that points in the scene close to be sensor get saturated easily. This would further imply a need for a high dynamic range sensor as well as reduced resource efficiency due to the need for sending strong light to nearby scenes.

In contrast, system of the present invention has an additional degree of freedom wherein the power of the laser and/or the exposure time of the sensor can be adjusted according to depth such that light fall-off is compensated to the extent possible under the device constraints and with respect to eye safety. Further, because the system only detects the presence or absence of objects, in an ideal scenario where albedo is the same everywhere, the laser can send small amounts of light to just overcome the readout noise of the sensor or the photon noise of ambient light, and only a 1-bit sensor is required.

Combining with Time-of-Flight Sensors—

The analysis above also indicates that the light curtain can be expected to get thicker, quadratically, with depth. Increasing baseline and other parameters of the system can only alleviate this effect in part due to the physical constraints on sensor size, laser spot thickness as well as the baseline. Replacing the line intensity sensor with a 1D continuous wave time-of-flight (CW-TOF) sensor alleviates the quadratic dependence of thickness with depth.

CW-TOF sensors measure phase to obtain depth. A CW-TOF sensor works by illuminating the scene with an amplitude modulated wave (typically, a periodic signal of frequency $f_m$ Hz) and measuring the phase between the illumination and the light intensity at each pixel. The phase difference φ and the depth d of the scene point are related as:

$$\phi = \text{mod}\left(\frac{f_m d}{c}, 2\pi\right)$$

As a consequence, the depth resolution of a TOF sensor is constant and independent of depth. Further, the depth resolution increases with the frequency of the amplitude wave. However, TOF-based depth recovery has a phase wrapping problem due to the presence of the mod (•) operator, which implies that the depth estimate has an ambiguity problem. This problem gets worse at higher frequencies. In contrast, traditional triangulation-based depth estimation has no ambiguity problem, but at the cost of quadratic depth uncertainty.

The complementary strengths of traditional triangulation and CW-TOF can be leveraged to enable light curtains with near-constant thickness over a large range. Triangulation and phase are fused by measuring the phase (as with regular correlation-based ToF) in addition the usual measurement of intensity.

Knowing the depth of the curtain, the appropriate phase to retain and discard pixels with phase values that are significantly different can be calculated. An alternative approach achieves this by performing phase-based depth gating using appropriate codes at illumination and sensing. The use of triangulation automatically eliminates the depth ambiguity of phase-based gating provided the thickness of the triangulation is smaller than the wavelength of the amplitude wave. With this, it is possible to create thinner light curtains over a larger depth range.

See Through Scattering Media—

In traditional imaging, the sensor receives first-bounce light reflected from an object as well as single-scattered light. With light curtains, the line sensor 102 avoids single-scattered light and only receives multi-scattered light. The ratio between first-bounce light and global light is much higher, thus contrast is better.

The light curtain method and device described herein has many benefits. The shape of a light curtain is programmable and can be configured dynamically to suit the demands of the immediate task. For example, light curtains can be used to determine whether a vehicle is changing lanes in front, whether a pedestrian is in the crosswalk, or whether there are vehicles in neighboring lanes. Similarly, a robot might use a curtain that extrudes its planned (even curved) motion trajectory. FIGS. 6(a,b) show various light curtains for use in robots and cars respectively.

Given an energy budget, in terms of average laser power, exposure time, and refresh rate of the light curtain, higher power and exposure can be allocated to lines in the curtain that are further away to combat inverse square light fall-off. This is a significant advantage over traditional depth sensors that typically expend the same high power in all directions to capture a 3D point cloud in an entire volume.

The optical design of the light curtain shares similarities with confocal imaging in that small regions are selectively illuminated and sensed. When imaging in scattering media, such as fog and murky waters, this has the implicit advantage that many multi-bounce light paths are optically avoided, thereby providing images with increased contrast.

A key advantage of light curtains is that illumination and sensing can be concentrated to a thin region. Together with the power and exposure adaptability, this provides significantly better performance under strong ambient illumination, including direct sunlight, at large distances (i.e., 20-30 m). The performance increases under cloudy skies and indoors to 40 m and 50 m respectively.

At any instant, the sensor only captures a single line of the light curtain that often has small depth variations and hence, little variation in intensity fall-off. Thus, the dynamic range of the measured brightness can be low. A such, even a one-bit sensor with a programmable threshold would be ample for the envisioned tasks.

Many sensor types are available for use with the device. Any line sensor could be used with the described device including intensity sensors (CMOS, CCD, IuGaAs), time-of-flight (ToF) sensors (correlation, SPAD), and neuromorphic sensors (DVS).

The system may be run under control of one or more microprocessors in communication with memory containing software implementing the functions of the system. The movement of the galvo mirrors 108, 126 is under the control of the software to define the shape of the light curtain. The software may be configurable to allow the definition of light curtains of various shapes. In addition, the software may control the cycling of light source 102 as well as the timing of the reading of the data from line sensor 122 and the application of any filtering to the data, for example, the filtering of ambient light. Objects may be detected by breaking the light curtain, causing a variance in the light in the line of pixels sensed by line sensor 122. Upon detection of an object that has breached the light curtain, an alert may be raise and communicated off-unit.

To those skilled in the art to which the invention relates, many modifications and adaptations of the invention will suggest themselves. The exemplary methods and apparatuses disclosed herein are not to be taken as limitations on the invention, but as an illustration thereof. The intended scope of the invention is defined by the claims which follow.

We claim:

1. A system comprising:
 a light source for creating a line of light defining an illumination plane;
 a line sensor for sensing a line of light in a sensing plane, the sensed line of light being defined by an intersection of the illumination plane and the sensing plane;
 a processor; and
 software executed by the processor for performing the functions of:
  steering the illumination plane and the sensing plane synchronously such that an intersection of the illumination plane and the sensing plane follows a pre-defined path defining a light curtain;
  cycling the light source on and off; and
  reading the line sensor as the light source is cycled on and off.

2. The system of claim 1 wherein the light source comprises:
 a laser diode;
 a collimation lens; and
 a Powell-type lens; and
 a first steerable mirror;
 wherein light emitted by the laser diode is formed into a line of light by the Powell-type lens before striking the first steerable mirror.

3. The system of claim 1 wherein the line sensor comprises a lens and a sensor capable of sensing a single line of pixels.

4. The system of claim 1 wherein the software performs the further functions of:
 detecting a variance in light detected by the line sensor, indicative of the presence of an object intersecting the light curtain.

5. The system of claim 4 wherein the software performs the further functions of:
 communicating an alert off-unit upon detection of the variance.

6. The system of claim 1 wherein the illumination plane and the sensing plane are rotated about parallel axes.

7. The system of claim 1 wherein the illumination plane and the sensing plane are rotated over two axes.

8. The system of claim 1 wherein the illumination plane and the sensing plane are rotated over two points.

9. The system of claim 1 wherein the line sensor is a continuous wave time-of-flight sensor.

10. The system of claim 1 wherein the illumination plane and the sensing plane are steered by steerable galvo mirrors.

11. The system of claim 1 wherein the illumination plane and the sensing plane are steered by mechanical motors.

12. The system of claim 1 wherein the line sensor is a 2D sensor having a rolling shutter or a region of interest mask.

13. A method comprising:
    creating an illumination plane by continuously sweeping a line light source back and forth over a first pre-defined path;
    creating a sensing plane by sweeping a line sensor back and forth over a second pre-defined path; and
    synchronizing the first and second pre-defined paths such that a line defining an intersection of the illumination plane and the sensing plane creates a light curtain of a desired shape.

14. The method of claim 13 further comprising:
    cycling the line light source on and off; and
    reading the line sensor as the line light source is cycled on and off.

15. The method of claim 14 further comprising:
    detecting variances in light detected by the line sensor, indicative of the presence of an object intersecting the light curtain.

16. The method of claim 13 wherein the illumination plane and the sensing plane are rotated about parallel axes.

17. The method of claim 13 wherein the illumination plane and the sensing plane are rotated over two axes.

18. The system of claim 13 wherein the illumination plane and the sensing plane are rotated over two points.

19. A non-transitory computer-readable storage media containing instructions that, when executed by a processor, perform the steps of:
    creating an illumination plane by continuously sweeping a line light source back and forth over a first pre-defined path;
    creating a sensing plane by sweeping a line sensor back and forth over a second pre-defined path; and
    synchronizing the first and second pre-defined paths such that a line defining an intersection of the illumination plane and the sensing plane creates a light curtain of a desired shape.

20. The computer-readable storage media of claim 19 containing further instructions that, when executed by a processor, perform the steps of:
    cycling the line light source on and off; and
    reading the line sensor as the line light source is cycled on and off.

21. The computer-readable storage media of claim 19 containing further instructions that, when executed by a processor, perform the steps of:
    detecting variances in the light detected by the line sensor, indicative of an object intersecting the light curtain.

22. The computer-readable storage media of claim 21 containing further instructions that, when executed by a processor, perform the steps of:
    communicating an alert off-unit upon detection of the variance.

23. The computer-readable storage media of claim 20 containing further instructions that, when executed by a processor, perform the steps of:
    filtering ambient light from light sensed by the line sensor by reading each line in the light curtain each line defining the intersection of the illumination plane and the sensing plane twice, once with the line light source illuminated and once without, and subtracting the readings.

* * * * *

UNITED STATES PATENT AND TRADEMARK OFFICE
CERTIFICATE OF CORRECTION

PATENT NO. : 11,493,634 B2
APPLICATION NO. : 16/470885
DATED : November 8, 2022
INVENTOR(S) : Srinivasa Narasimhan et al.

It is certified that error appears in the above-identified patent and that said Letters Patent is hereby corrected as shown below:

In the Specification

In Column 1, Line 21, following the Government Interest paragraph, please delete "This invention was made with government support under CNS1446601 awarded by the NSF, N000141512358 awarded by the ONR, N000141612906 awarded by the ONR, DTRT13GUTC26 awarded by the DOT, and HR00111620021 awarded by DARPA. The government has certain rights in the invention."

And insert therefor --This invention was made with United States government support under 1446601 awarded by the National Science Foundation (NSF), N00014-15-1-2358 and N00014-16-1-2906 awarded by the Office of Naval Research (ONR), DTRT13-G-UTC26 and 69A3551747111 awarded by the Department of Transportation (DOT), and HR0011-16-2-0021 awarded by the Defense Advanced Research Projects Agency (DARPA). The government has certain rights in the invention.--

Signed and Sealed this
Second Day of January, 2024

Katherine Kelly Vidal
*Director of the United States Patent and Trademark Office*